United States Patent [19]

Mukherjee et al.

[11] Patent Number: 4,843,567

[45] Date of Patent: Jun. 27, 1989

[54] DEVICE TO ASSIST ADAPTIVE REORDERING OF SEQUENTIAL DECISIONS

[75] Inventors: Amar Mukherjee, Maitland, Fla.; Kadathur S. Natarajan, Somers; Harold S. Stone, Chappaqua, both of N.Y.

[73] Assignee: International Business Machines Corp., Armonk, N.Y.

[21] Appl. No.: 79,721

[22] Filed: Jul. 30, 1987

[51] Int. Cl.$^4$ ........................ G06F 15/46; G06F 15/18
[52] U.S. Cl. ................................. 364/513; 364/148; 364/300; 364/194; 382/39
[58] Field of Search ............... 364/140, 141, 148–152, 364/156, 200, 300, 900, 513, 194, 464; 382/14, 15, 36–39

[56] References Cited

PUBLICATIONS

Wayne E. Smith, "Various Optimizers for Single-Stage Prod.", *Naval Research Logistics Quart.* 3 (1956) pp. 59–66.
Herbert A. Simon et al. "Optimal Problem-Solving Search", *Artificial Intelligence*, 6(3), 1975, pp. 235–247.
Ronald Rivist, "On Self-Organizing Sequential Search Heuristics", *Communications of the ACM*, vol. 19, No. 2, Feb. 1976, pp. 63–67.
Barr et al., *The Handbook of Artificial Intelligence*, vol. 1, "Heuristic State-Space Search", pp. 58–83, date unknown.

*Primary Examiner*—Allen MacDonald
*Attorney, Agent, or Firm*—C. Lamont Whitham; Michael E. Whitham

[57] ABSTRACT

A system for the adaptive reordering of sequential decisions in the search of a data base is provided with a device that simplifies and speeds up a heuristic search method by implementing in hardware the computation required for the adaptive reordering. The system includes an arithmetic unit for computing for each decision the ratio p/c where p is the probability of a successful outcome of the decision and c is the cost of computation to make that decision. The arithmetic unit includes a device for estimating the logarithms of the prabability p and the cost c for each decision. Logarithms of ratios p/c are calculated for each decision by subtracting the log c from the log p, and then the logarithms of the ratios for the decisions are compared to produce a priority value for each decision. The decisions are reordered based on the priority value assigned to each decision to obtain the optimal ordering of the decisions.

4 Claims, 3 Drawing Sheets

DEVICE TO ASSIST ADAPTIVE REORDERING OF SEQUENTIAL DECISIONS

CROSS-REFERENCE TO RELATED APPLICATION

This application is related in subject matter to co-pending application Ser. No. 885,101 filed July 14, 1986 now U.S. Pat. No. 4,752,890, by Kadathur S. Natarajan and Harold S. Stone for "Adaptive Mechanisms for Execution of Sequential Decisions". That application is assigned to the assignee of this application and the disclosure thereof is incorporated herein by reference.

DESCRIPTION

BACKGROUND OF THE INVENTION

1. Field of the Invention

The present invention generally relates to the field of artificial intelligence and, more particularly, to a device that simplifies and speeds up a heuristic search method by implementing in hardware the computation required for adaptive reordering of sequential decisions in expert systems.

2. Background of the Invention

The invention is intended to be used with algorithms that adaptively reorder a sequence of decisions so that the average time to execute the decisions is minimized. The idea of ordering the outcomes of decisions to improve performance is explored, for example, in the following articles: Wayne E. Smith, "Various Optimizers for Single Stage Production", *Naval Research Logistics Quarterly*, 3 (1956), pp. 59–66; Herbert A. Simon and Joseph B. Kadane, "Optimal Problem-Solving Search: All-or-None Solutions", *Artificial Intelligence*, (3), 1975, pp. 235–247; and Ronald Rivest, "On Self-Organizing Sequential Search Heuristics", *Communications of the ACM*, vol. 19, no. 2, Feb. 1976, pp. 63–67.

A problem-solving system that uses forward reasoning and whose operators each work by producing a single new object or state in a database of information is said to represent problems in a state-space representation. The general idea of a state-space search algorithm that uses heuristic information to decide which node to expand next is always to expand the node that seems the most promising. An algorithm that implements this idea is called an ordered search or best-first search algorithm. Optimal ordering is a function of the frequency of success and the cost of evaluating the outcome. Adaptive reordering is useful in searching simple lists and data bases, and in ordering rules to examine in expert-systems programs. See generally Avron Barr and Edward A. Feigenbaum, editors, The *Handbook of Artificial Intelligence*, vol. 1, "Heuristic State-Space Search", pp. 58 et seq., HeurisTech Press (1981).

Costs and probabilities can be estimated during program execution in order to create adaptive searches that eventually converge to an optimal ordering. Rivest, supra, describes two techniques that converge to the optimal ordering in the special case in which all costs are unit costs. The problem is best illustrated by way of example. Assume that we have a list of decisions, each with a Yes/No outcome. Our objective is to go through the list of decisions, one at a time, evaluating each decision and examining its outcome until we reach a decision that yields a Yes outcome. At this point we terminate. We wish to order the decisions so that the time to reach the first successful outcome is minimum for the average case.

The central idea of the reordering is to compute for each decision the ratio p/c, where p is the probability of a successful outcome of the decision, and c is the cost of computation to make that decision. The optimum ordering of decisions is in descending order of the ratio p/c. This ratio need not be known beforehand because it can be estimated during program execution. The probability p for a given decision rule is estimated as the ratio of the number of successes divided by the total number of calculations of the decision. The cost c is estimated as the ratio of the total expended time for all evaluations of a rule divided by the number of decision calculations for that rule. The ratio p/c is then estimated by the number of successes for a rule divided by the total time expended in evaluating the rule. The number of decision calculations is a factor common to both numerator and denominator of p/c and thus cancels out when computing the ratio.

Based on the size of the data base, the number of divisions required to compute the ratios p/c for each of the rules will determine the time required for reordering the decisions in the adaptive search. Multiplications and divisions are among the most time consuming, and hence expensive, calculations that may be made by a computer. Thus, for a very large data base the optimal reordering of the search may itself become very expensive.

SUMMARY OF THE INVENTION

It is therefore an object of the present invention to provide a hardware device which is fast and inexpensive and eliminates division completely by using integer addition, and subtraction together with a equality detector.

The present invention is based on the recognition that optimal ordering depends only on the relative magnitude of p/c for each decision. This being the case, any monotonic function f(p/c) can be used in place of p/c when making the comparisons for optimal reordering. Thus, according to the invention, we use log(p/c) in place of p/c itself. Since log(p/c) is approximated by log(number of successes) minus log(total execution time) for each particular rule, we can compare the log of two ratios by computing log (number of successes of Rule 1) minus log (number of successes of Rule 2) plus log (total execution time of Rule 2) minus log (total execution time of Rule 1), which is simple addition and subtraction of logarithms. If the logarithm is inexpensive to compute, then the addition and subtraction operations would be less costly to compute than ratios, especially if the reordering were executed by special dedicated hardware for reordering decisions.

In fact, the logarithm can be approximated reasonably accurately for our purposes by using a floor function of the radix 2 logarithm, which is the greatest integer that does not exceed the true base 2 logarithm. For any integer N, floor (log base 2 (N)) is equal to the number of significant bits in the binary representation of N. For example, the integer 13 (base 10) when represented in binary is 1 1 0 1, and when right adjusted in an 8-bit word or byte, the representation is 0 0 0 0 1 1 0 1. The estimate of the log should return the value 3, which is the bit position of the leading 1 in this representation. (Bit positions are numbered from 0 to 7 starting from right to left.)

In the preferred embodiment of the invention, a priority-encoder device is used to return the binary-encoded bit position of the leading one in a binary vector. Therefore, this device computes the logarithm required for our special-purpose reordering device. The operations performed by our device are the following:

Unsuccessful Decision

1. Increase the total time for this decision by the time required to make the new decision.

Successful Decision

1. Increase the total time for this decision by the time required to make the new decision.
2. Increase the success count for this decision by one.

Reorder Decisions

1. Compute priority (success count) minus priority (total time) for each decision in the list of decisions.
2. Sort the list of decisions using the values computed in step 1 as the sort key.

The notation priority (success count) is intended to indicate the function computed by the priority encoder with the value of success count on the input of the encoder. This function is equal to the floor of the base 2 logarithm of success count as discussed above.

BRIEF DESCRIPTION OF THE DRAWINGS

The foregoing and other objects, aspects and advantages of the invention will be better understood from the following detailed description of a preferred embodiment of the invention with reference to the drawings, in which.

DETAILED DESCRIPTION OF A PREFERRED EMBODIMENT OF THE INVENTION

The subject invention is intended to be used in an adaptive mechanism of the type disclosed, for example, in copending application Ser. No. 885,101 referenced above. In that adaptive mechanism, a chain of decisions made in the course of searching a data base, for example, is reordered based on observations made during their execution in order to produce an ordering that achieves faster execution. Eventually, the average performance over a period of time converges to the optimum performance.

In operation, it is assumed that the costs (for success and failure) and probabilities for the different alternatives are not known when the program is written, so that the programmer cannot determine the optimal ordering from a priori knowledge. When the search program is presented a sequence of problem instances to solve, it follows the initial ordering of the search tree. As it solves these problem instances, it also monitors the amount of search effort (CPU time or number of instructions or some other dominant measure) it spends in trying the different alternatives. The information it gathers from repeated observations of the execution of the search program is used to produce automatically a near-optimal ordering of the alternatives.

Figure 1:
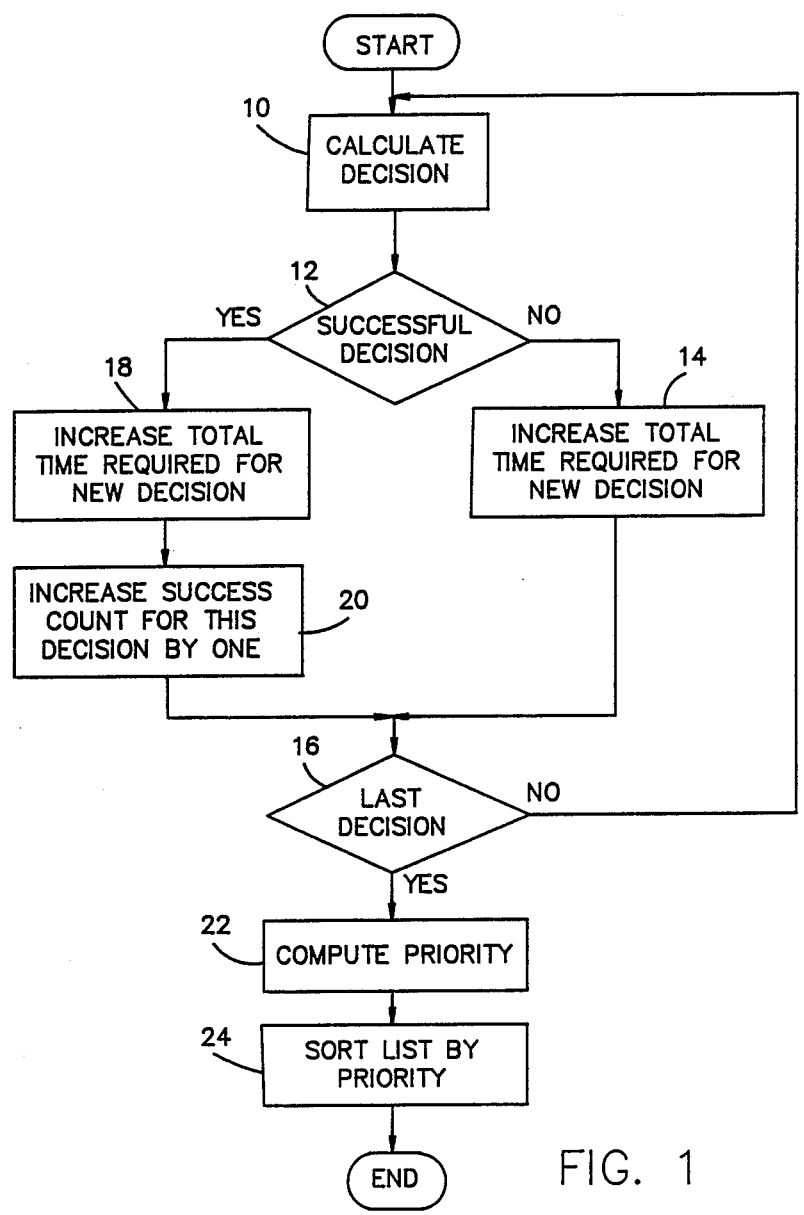
FIG. 1 is a flow diagram showing the adaptive reordering process in which the subject invention is used.

Referring now to the drawings, and more particularly to FIG. 1, there is shown a flow diagram of the adaptive reordering process. This is a simplified illustration of the process, and the reader is referred to the above-reference, copending application Ser. No. 885,101 now U.S. Pat. No. 4,752,890, for a more detailed explanation. In the flow diagram, the process begins by calculating a decision in function block 10. A test is then made in decision block 12 to determine if the decision was successful. If not, then in function block 14 the total time required for making a new decision is increased by the time that was used to make the present decision. Then a check is made in decision block 16 to determine if the last decision has been made in the data base. If not, a new decision is calculated in function block 10.

Assume now that the test made in decision block 12 is true; i.e., the decision calculated in function block 10 is successful. In this case, the process branches to function block 18 where the total time required for the new decision is increased by the time of this decision, just as in function block 14, and then in function block 20, the success count for this decision is increased by one. Again, a test is made in decision block 16 to determine if this is the last decision, and if not, a new decision is calculated in function block 10.

In each case, the times required for the decisions are stored. These times correspond to the cost c of calculating the decision. Similarly, the success counts are stored, and these correspond to the probabilities p. When all the decisions have been made, that is the test in decision block 16 is true, then the process of reordering the decisions is begun. First, the priorities of the decisions are computed in function block 22. As described, this is accomplished by computing the ratios $p_i/c_i$. Once the priorities have been computed, the list is sorted based on the computed priorities in function block 24.

Figure 2:
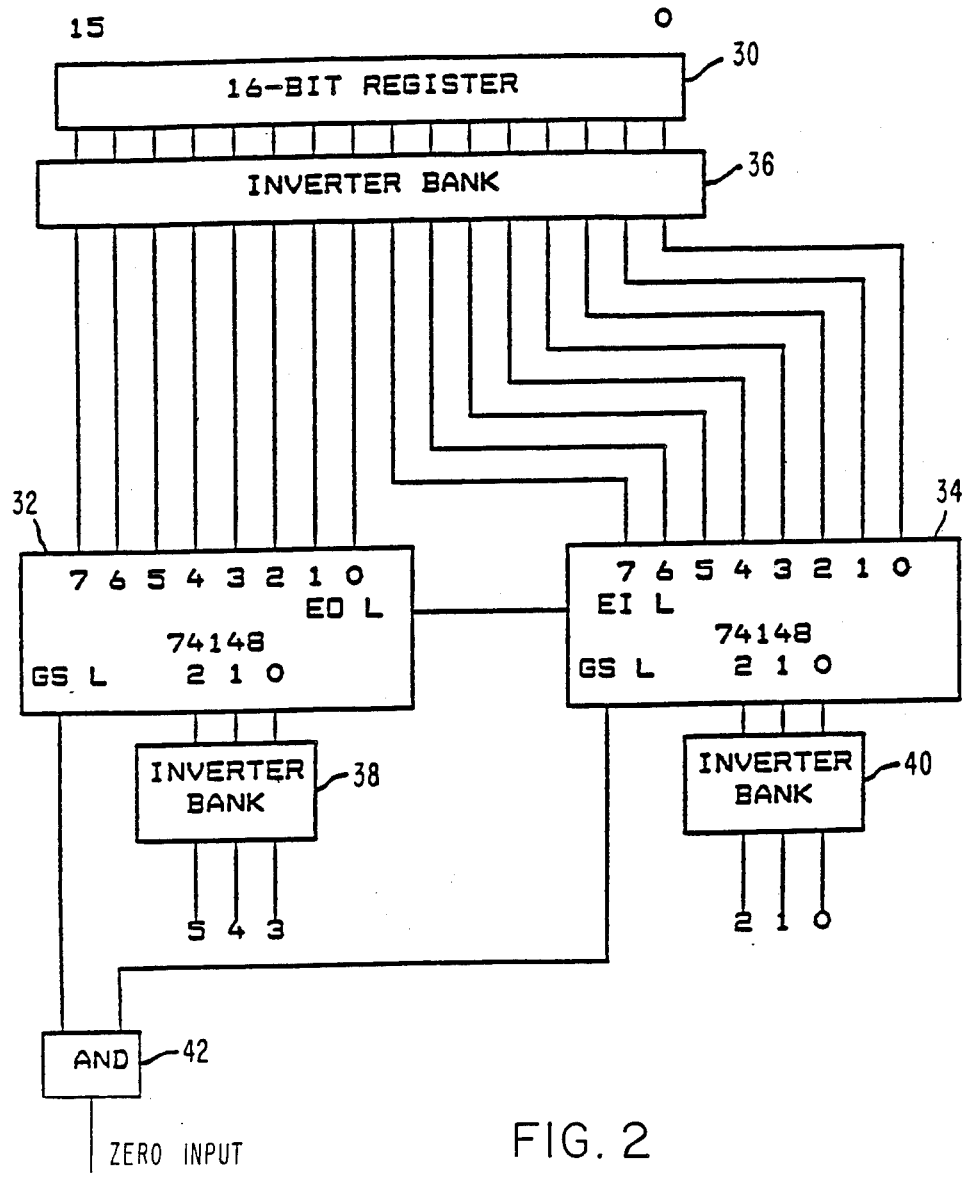
FIG. 2 is a block and logic diagram of the hardware for approximating the base 2 logarithm of a 16-bit integer.

The present invention is specifically directed to the hardware implementation of the priority computation represented by function block 24 of FIG. 1. With reference now to FIG. 2, an integer resident in register 30 has a high-order bit labeled as "15", signifying the bit of weight $2^{15}$, and the low order bit labeled as "0". The basic function of the device is to estimate the logarithm of the operand. It does so by detecting the most significant one in the binary encoding of the operand, and placing a code for the position of the leading one into the output register.

In the preferred embodiment of the invention, the detection of the leading one is done by a pair of logic devices known as priority encoders. In FIG. 2, the encoders are shown as two 74148 devices 32 and 34, but any equivalent device or combination of devices can be used with changes in wiring made to accomodate any difference among devices. 74148 devices are commercially available devices manufactured by several including Signetics and Texas Instruments. Detailed descriptions are contained, for example, in *FAST Data Manual*, pp. 6–103 to 6–107, published in 1986 by Signetics, and in *Standard TTL*, vol. 2, pp. 3–555 to 3–560 published in 1985 by Texas Instruments.

These devices encode eight data lines to three-line binary so that only the highest-order data line is encoded. The 74148 accepts inputs encoded in the complement of the binary numbering system and produces outputs in the complement as well. For this reason, the inputs pass through a bank of inverters 36 to produce the complementary input, and the outputs of the 74148 devices 32 and 34 pass through banks of inverters 38 and 40, respectively, to change the complementary encoding to a direct encoding.

The 74148 devices each encode eight bits, but provide for concatenating their activity to longer word lengths through the signals EO L and EI L, respectively Enable Output (active Low) and Enable Input (active Low). If all eight high order bits of a 16-bit operand are zeros, then EO L changes to a low value. This low value activates the encoder for the least significant eight bits to encode the leading one on its inputs. Otherwise, the least significant encoder produces the complement of the code for line 0 as having the leading one bit.

If all inputs of a 74148 contain binary ones, signifying a situation in which the corresponding bits of the original input data contain only binary zeros, then the device produces a high on the signal line GS L, for Group Signal (active Low). The AND gate 42 produces a high if both 74148 devices produce a high on GS L, which signifies that all sixteen data bits of the operand are binary zeros.

Note that the input datum 0000 0000 0000 0101, for the integer 5 (base 10), is complemented in inverter bank 36 to become 1111 1111 1111 1010 at the inputs of the 74148 devices 32 and 34. The most significant device 32 produces a high on GS L, and a low on EO L. Its data output bits are 111, which when complemented become 000. The least significant 74148 device 34 encodes its inputs because its EI L input has a low value, and it produces 101 at its outputs with a low on GS L. The 101 is complemented in inverter bank 40 to become 010, and the full output value is 000 010, the binary encoding of the value 2 (base 10). The correct approximation to the logarithm is 2. Since one GS L input is zero and the other is 1, the output of the AND gate 42 is zero, and the circuit thereby signals that the input datum is not zero.

In the context of the adaptive search, it is necessary to compare ratios of the form pi/ci. To use the invention in that context, the following steps are performed:

1. Given variables $p_1$, $p_2$, $c_1$, and $c_2$, for each variable compute the log approximation from the device shown in FIG. 2.

2. Calculate $r_1 = \log p_1 - \log c_1$ and $r_2 = \log p_2 - \log c_2$.

3. Compare $r_1$ to $r_2$. If $r_1$ is larger, then assume that the ratio $p_1/c_1$ is larger than the ratio $p_2/c_2$.

Figure 3:
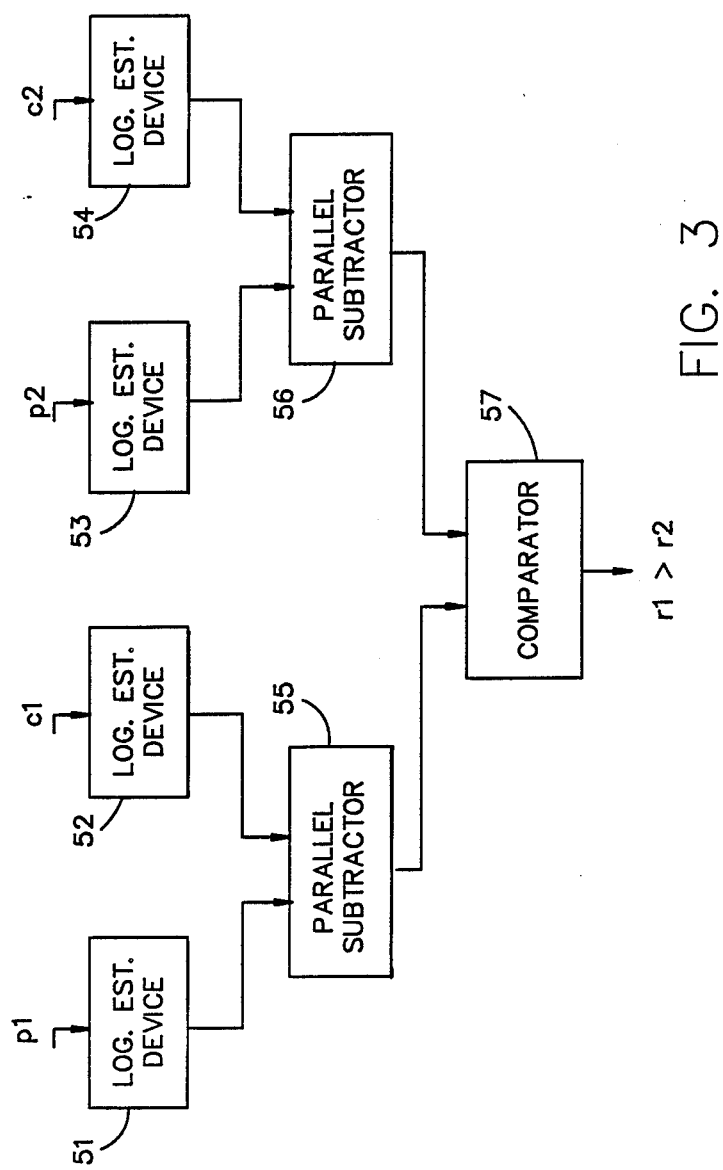
FIG. 3 is a block diagram showing the arithmetic unit employing the hardware of FIG. 2 for performing the computations required in the adaptive reordering process.

Referring now to FIG. 3, there is shown in block diagram form a pipelined arithmetic unit for performing the above calculations. Four identical log approximation devices 51, 52, 53, and 54, each a replication of the hardware shown in FIG. 2, are provided. The success counts corresponding to probabilities $p_1$ and $p_2$ are supplied as inputs to devices 51 and 53, while the times corresponding to costs $c_1$ and $c_2$ are supplied as inputs to devices 52 and 54. The outputs of each of these devices are the log approximations of their respective inputs. The difference between the outputs of devices 51 and 52 is determined by a first parallel full subtractor 55. Similarly, the difference between the outputs of devices 53 and 54 is determined by a second parallel full subtractor 56. The outputs of the subtractors 55 and 56 are, respectively, the quantities $r_1$ and $r_2$ defined in step 2 above.

These are then compared by comparator 57 which provides an output when $r_1 > r_2$.

This algorithm is a fast algorithm for comparing the ratios, but it has some error associated with it. The logarithm estimate produces an integer logarithm, when in fact the logarithm may be fractional. Consequently, when the approximation produces the value L, the true value lies in the interval [L,L+1). The approximation to the log of the ratio is produced by subtracting two such intervals. If the approximation to the log of the ratio is R, then the true log of the ratio lies in the interval (R−1,R+1). Since the log of the ratio is in error by at most one bit, the true ratio is approximated to within a factor of two.

The adaptive decision is to choose the larger of a pair of ratios, and this decision is made correctly when the ratios lie farther apart than a factor of two. The decision as to which is larger may be incorrect when the ratios are within a factor of two, but when they are this close, the impact of the erroneous decision on the final running time is limited to marginal differences in cost due to an exchange in the order of nearly equal ratios. In practice, this is not likely to be a large quantity, and it is possible that the quantity is negligible when there are many different alternatives and the decision error affects the ordering of only two nearly equal ratios.

When quantities are held in normalized floating-point format, the exponent field of the format provides a direct approximation of the logarithm. In lieu of using the device for approximating the logarithm depicted in FIG. 2, the equivalent is to approximate the logarithm by extracting the exponent field of a floating-point number.

It is also possible to approximate the logarithm without extracting the exponent, providing that the floating-point format permits this operation. The requirement is that operands be normalized and that the exponent be held in the high-order bits of the representation, except possibly for the highest-order bit that can be reserved for the sign of the operand. The exponent must also be held in a biased format so that the least exponent is encoded as a field of zeros and the greatest exponent is encoded as a field of ones. The following format used by the IEEE Standard for Binary Floating Point Arithmetic, 754-1985, has the desired property:

| sign | exponent with bias | fraction |
| --- | --- | --- |

For single precision, the exponent field is eight bits or one byte, and the bias is 127. For double precision, the exponent field is eleven bits, and the bias is 1023. The sign bit can give a false designation of relative size if it is negative, but for the adaptive search, all numbers are positive, so the sign bit is zero for all operands.

To estimate the logarithm of the ratio p/c with both p and c positive normalized floating point numbers, simply treat the floating-point representations as integers and subtract them. The leading bits of the result will be the difference in the exponents of the representations, and thus will be the difference in the estimate of the logarithms. The trailing bits will be the difference in the fractions, and thus will be erronous digits, but the size of the error is less than one significant bit in the exponent fields, and thus is less than a factor of two in the estimate of the original ratios.

The following is a pseudocode description of a software implementation of the adaptive search according to the invention. The program has been implemented for the adaptive reordering of clauses in a Prolog program, but other artificial languages such as LISP could also be used. The main steps in the software computation of the ratios (probability of success to cost of evaluating a decision) are described in sufficient detail to enable a programmer to write source code in whatever language he or she may be proficient. Assuming a Prolog program, the steps are as follows:

(1) Read a Prolog program into the workspace (interpreter database). Suppose a predicate has N alternate clauses; i.e., decisions that can be adaptively reordered.

(2) Transform the Prolog program into a form that can automatically collect statistical performance information when executed.

(3) Execute the transformed program and gather the required performance information ($p_1, c_1, p_2, c_2, \ldots, p_N, c_N$).

(4) Compute ratios (p/c) and compare pairs ($p_i/c_i$ versus $p_j/c_j$). According to the invention, the following steps are implemented in hardware:

```
/* comp(+(any.X1.X2.pred), + (any.Y1.Y2.pred)) holds
if X1/X2 > Y1/Y2. */
comp(*.P1.C1,*.P2.C2) ← P1*C2>C1*P2 & /.
comp(*.P1. 0,*.P2. 0) ← / & P1>P2.
comp(*. 0.C1,*. 0.C2) ← / & C2>C1.
comp(*.P1.C1,*. 0.C2) ← /.
```

(5) Sort the decisions according to the results obtained in step 4. Rank them in a descending sequence for subsequent decision-making.

While the invention has been illustrated in terms of a single preferred embodiment and a description has been made of alternative implementations, those skilled in the art will recognize that the invention may be practiced with modification within the spirit and scope of the appended claims.

Having thus described our invention, what we claim as new and desire to secure by Letters Patent is as follows:

1. In a system for the adaptive reordering of sequential decisions in the search of a data base so that the average time to execute the decisions is minimized, said system including computing means for computing each decision the ratio p/c where p is the probability of a successful outcome of the decision and c is the cost of computation to make that decision, said computing means comprising:

means for estimating the logarithms of the probability p and the cost c for each decision;
means for subtracting the logarithm c from the logarithm p to produce a ratio of p/c for each decision;
means for comparing the ratios of p/c to produce a priority value for each decision; and
means for reordering said decisions based on the priority value assigned to each decision.

2. The system for adaptive reordering of sequential decisions as recited in claim 1 wherein said means for estimating logarithms comprises:

register means for temporarily storing a binary number corresponding to one of said probability p or cost c for each decision; and
priority encoder means connected to said register means and providing an output corresponding to a leading one in said binary number, said output being an estimated logarithm of said binary number.

3. The system for adaptive reordering of sequential decisions as recited in claim 2 wherein said priority encoder means comprises:

first and second priority encoders connected respectively to high and low order bit positions of said register means, said first priority encoder providing an enabling signal to said second priority encoder when all high order bit positions are binary zeros, both of said first and second priority encoders providing an output indicating a condition of all binary zeros in said register means at the bit positions to which they are connected; and
an AND gate connected to said first and second priority encoders and responsive to said outputs to provide a signal indicating that all bit positions in said register means are binary zeros.

4. A method for the adaptive reordering of sequential decisions in the search of a data base so that the average time to execute the decisions is minimized, said method comprising:

estimating the logarithms of the probability p of a successful outcome of a decision and the cost c of computation to make that decision for each decision;
subtracting the logarithm c from the logarithm p to produce a ratio of p/c for each decision;
comparing the ratios of p/c to produce a priority value for each decision; and
reordering said decisions based on the priority value assigned to each decision.

* * * * *